United States Patent

Hirasawatu et al.

[11] Patent Number: 6,131,724
[45] Date of Patent: Oct. 17, 2000

[54] CONVEYOR CHAIN APPARATUS

[75] Inventors: Tadao Hirasawatu; Mamoru Oshida, both of Koto-ku, Japan

[73] Assignee: Yoshino Kogyosho Co., Ltd., Tokyo, Japan

[21] Appl. No.: 09/043,299

[22] PCT Filed: Jul. 16, 1997

[86] PCT No.: PCT/JP97/02466

§ 371 Date: Mar. 18, 1998

§ 102(e) Date: Mar. 18, 1998

[87] PCT Pub. No.: WO98/04483

PCT Pub. Date: Feb. 5, 1998

[30] Foreign Application Priority Data

Jul. 25, 1996 [JP] Japan ................................ 8-213271

[51] Int. Cl.[7] ................................................. B65B 17/32
[52] U.S. Cl. ..................... 198/681; 198/606; 198/626.1; 198/817
[58] Field of Search ............................... 198/626.1, 606, 198/817, 681

[56] References Cited

U.S. PATENT DOCUMENTS

| 3,454,142 | 7/1969 | Holstein | 198/626.1 |
| 3,915,291 | 10/1975 | Vogts | 198/626.1 |
| 3,934,993 | 1/1976 | Bowman et al. | |
| 4,802,571 | 2/1989 | Born et al. | 198/817 X |
| 5,094,340 | 3/1992 | Avakov | 198/626.1 |
| 5,353,908 | 10/1994 | Wihlidal | |
| 5,553,698 | 9/1996 | Patois et al. | 198/626.1 |

FOREIGN PATENT DOCUMENTS

WO 97/09255  3/1997  WIPO.

*Primary Examiner*—Christopher P. Ellis
*Assistant Examiner*—Gene O. Crawford
*Attorney, Agent, or Firm*—Oliff & Berridge, PLC

[57] ABSTRACT

A conveyor chain includes chain links connected by connecting pins. Each chain link is provided with a bottle conveyor member attached to a main offset link member having a pin link, a bushing, and a conveyor member attachment plate of a synthetic resin or plastics. The conveyor chain is supported by sprocket wheels and chain guidance members to configure a conveyor chain apparatus. The arrangement is such that a pair of the conveyor chain apparatuses are disposed on each side of a conveyor path for bottles and also a holder ring provided at a mouth portion of a bottle is held from both sides by the bottle conveyor members. The conveyor chain apparatus is configured so that bottles are conveyed thereby in a state suspended from neck portions thereof.

16 Claims, 6 Drawing Sheets

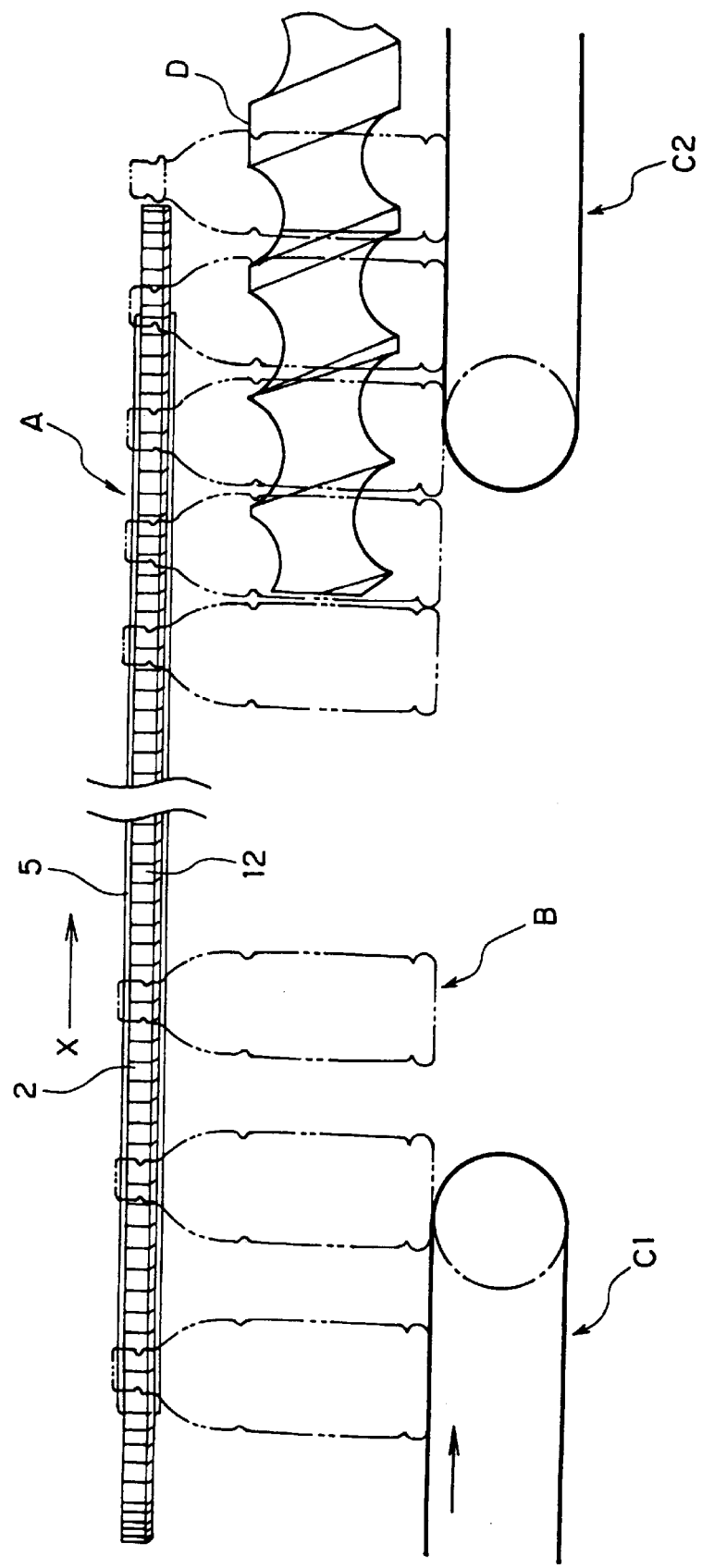

CONVEYOR CHAIN APPARATUS

TECHNICAL FIELD

The present invention relates to an apparatus for conveying hollow vessels and, in particular, to a conveyor chain apparatus for conveying hollow vessels in a suspended state after blow molding thereof has ended.

BACKGROUND OF THE INVENTION

In a production line for fabricating hollow vessels, which are bottles or the like formed by blow-molding a synthetic resin or plastics, a belt conveyor or air conveyor is often used in the art as an apparatus for conveying the molded bottles.

However, a problem occurs during the conveying of bottles by a belt conveyor in that, if the conveyor apparatus is started or halted while the bottles are being conveyed, the bottles frequently fall over, and these bottles are particularly likely to fall over at a feed-screw inlet portion thereof, forcing the mechanism of the manufacturing line to halt.

The conveying of bottles by an air conveyor involves a problem in that, although it is possible to prevent the bottles from falling over because the neck portions of the bottles are suspended from rails provided in an opening in a lower surface of the wind tunnel box and an airflow from an air blower is blown against the mouth portions of the bottles to convey them, friction between the rails and the bottle necks occurs along the entire length of the bottle conveyor path, which tends to damage the bottles.

Another problem occurs because the bottles are conveyed by an airflow, in that the conveyor speed can easily become unstable due to variations in the air pressure or the like, and this causes bottles that have been halted to be hit by bottles coming from behind, deforming them.

A further problem occurs in that there is likely to be dust in the airflow from the air blower, leading to the danger that this dust will be mixed into the interior of the hollow vessels, such as bottles.

DISCLOSURE OF THE INVENTION

The present invention was devised with the aim of solving the above described problems with the prior art and has as its objective the provision of a suspended-bottle type of conveyor chain apparatus that has none of the above problems, such as bottles falling over or becoming damaged.

In order to achieve the above objective, the present invention configures a conveyor chain apparatus as a conveyor chain apparatus for bottles in such a manner that a conveyor chain formed integrally of a main link member and a bottle conveyor member is disposed on both sides of a conveyor path for bottles, and bottles are conveyed suspended thereby with neck portions thereof held by bottle conveyor members on both sides.

In addition, the conveyor chain is formed by linking chain links by connector pins, where each chain link is formed integrally of a bottle conveyor member that is provided with a bottle holder plate and a main, link member that is equipped with a pin connection link, a bushing, and a conveyor member attachment portion, as specific means for the conveyor chain apparatus; the conveyor chain apparatus is configured by supporting this conveyor chain on sprocket wheels and intermediate guidance members on either side; the thus configured pair of conveyor chain apparatuses are disposed on either side of the conveyor path for bottles in such a manner that neck portions of bottles are held by bottle holder plates on both sides; and bottles are conveyed by the driving of chain-driving sprocket wheels in a state in which the bottles are suspended.

Furthermore, the bottle conveyor member provided with the bottle holder plate is formed of a low-friction material as the bottle conveyor member, side surfaces on both sides of the bottle holder plate are formed in such a manner that lower edges thereof are inclined forward in the conveyor direction, so that, when bottles are delayed, the bottles are maintained in a suspended state and slide over the bottle holder plate.

BRIEF DESCRIPTION OF THE DRAWINGS

FIG. 2 is a side view, schematically showing a state in which bottles are conveyed by using the conveyor chain apparatus of the present invention;

BEST MODE FOR CARRYING OUT THE INVENTION

Embodiments of the present invention are described below with reference to the accompanying figures.

Figure 1:
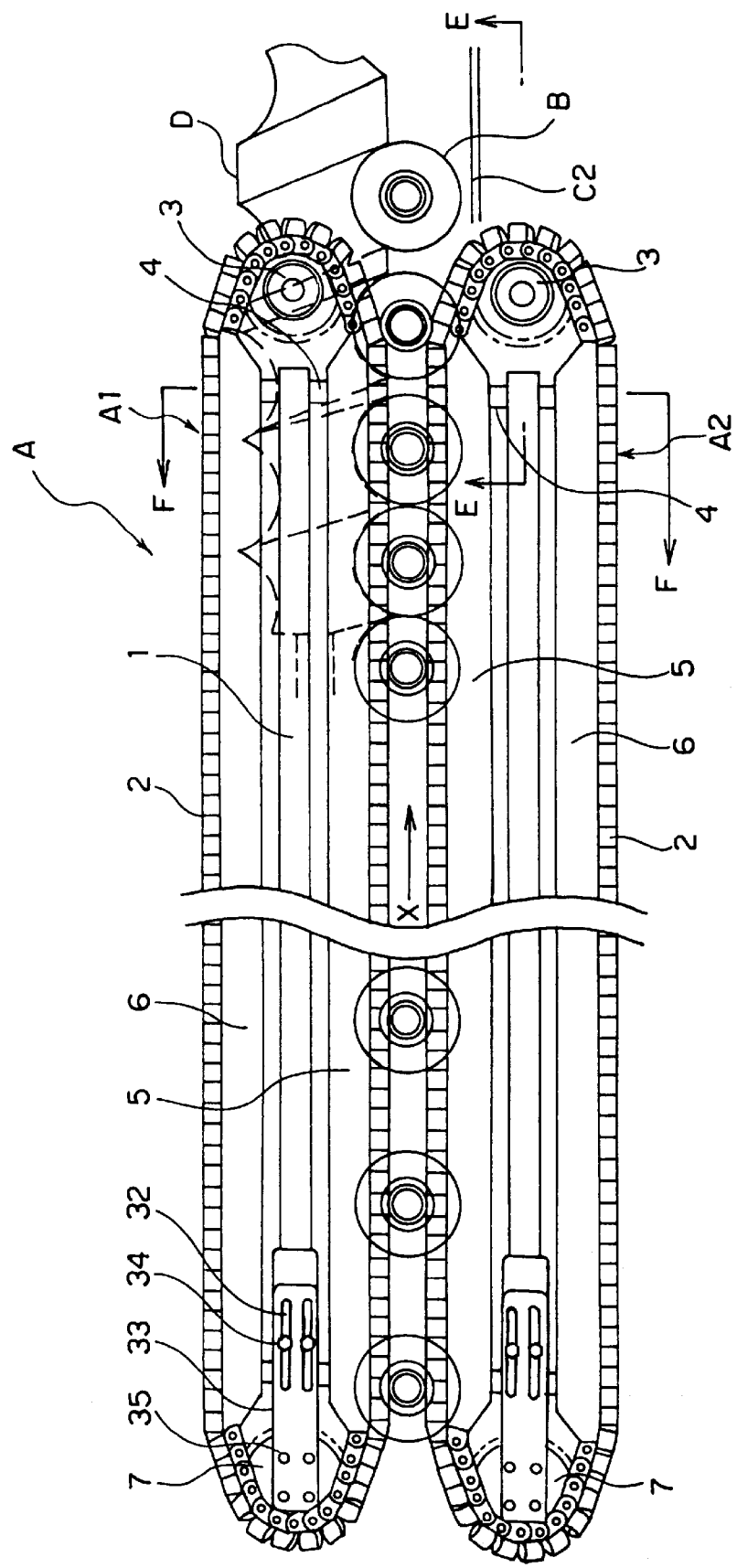
FIG. 1 is a plan view of a conveyor chain apparatus in accordance with the present invention.

The state of the conveyor chain apparatus when in use is configured as denoted overall by A in FIGS. 1 and 2. This conveyor chain apparatus A is designed to convey a bottle, which has a mouth portion formed into an annular holder portion, in a suspended state as denoted by the symbol B.

A belt conveyor C1 that carries bottles from a previous stage is provided overlapping a forward portion of the conveyor chain apparatus A and another belt conveyor C2 and a feed screw D that supply bottles to a next stage are provided overlapping a rear portion thereof.

The conveyor chain apparatus A is formed in such a manner that a pair of chain devices A1 and A2 are disposed on either side of a path along which bottles are conveyed, and these chain devices A1 and A2 are fixed to a device frame (not shown in the figure) by support frames 1.

Each of the chain devices A1 and A2 is equipped with a conveyor chain 2 and a sprocket wheel 3 that drives the conveyor chain 2 around, to form a circuit The sprocket wheels 3 are driven to rotate by a drive source (not shown in the figure) that is mounted on the device frame, in such a manner that the conveyor chains 2 are driven in a circuit thereby.

Chain guidance members 5 and 6 are attached by support brackets 4 to either side of each of the support frames 1, and an idler sprocket wheel 7 is also attached to a rear end of each of the support frames 1 in such a manner as to enable positional adjustment in the forward and rearward directions.

Each conveyor chain 2 is supported in a freely rotational manner by the corresponding driving sprocket wheel 3, chain guidance members 5 and 6, and idler sprocket wheel 7, and is configured to be driven along the chain guidance members 5 and 6 by the rotational drive of the driving sprocket wheel 3.

The linkage configuration of this conveyor chain 2 will now be described.

Each chain link 9 of the conveyor chains used in the present invention is constructed of a main link member 10 and a bottle conveyor member 11 that is formed integrally with this main link member, as shown in FIG. 3.

It is most suitable to form each chain link 9 by using stainless steel, which has abrasion resistance and low friction characteristics, as a material.

A synthetic resin comprising a polyamide, polyacetal, polyethylene terephthalate (PET), polybutylene terephthalate (PBT), or other plastic could be used as a plastic material therefor, but polyacetal would be best if the bottles are made of polyethylene terephthalate Connecting links, offset links, or the like could be used as the chain link structure, but each of the main link members 10 used in the present invention is of a so-called offset link type having an integral structure of a link plate and a running fit, comprising a pin connection link portion 12, a bush portion 13, and a conveyor member attachment portion 14.

Two link plates (offset plates) 15a and 15b are provided on the pin connection link portion 12, opposed to upper and lower end surfaces thereof, through holes 17a and 17b for connection pins 16 are provided penetrating through the link plates 15a and 15b, and upper and lower end surfaces of the link plates 15a and 15b are formed as surfaces 18a and 18b. that slope towards the conveyer member attachment side.

The bush portion 13 is supported by the conveyor member attachment portion 14 and support arms 19a and 19b that are connected to the respective link plates 15a and 15b, and a through hole 20 for one of the connection pins 16 is provided penetrating through the center of the bush portion 13.

The bottle conveyor member 11 is formed to have an approximately L-shape of an attachment plate portion 21, which is connected to the attachment portion 14 of the main link member 10, and a bottle holder plate 22, which extends horizontally from the attachment plate portion. In addition, cut surfaces 23 on either side of the bottle holder plate 22 are formed as inclined surfaces where the lower edge thereof points forward with respect to the conveyor direction (indicated by the arrow X).

Figure 8:
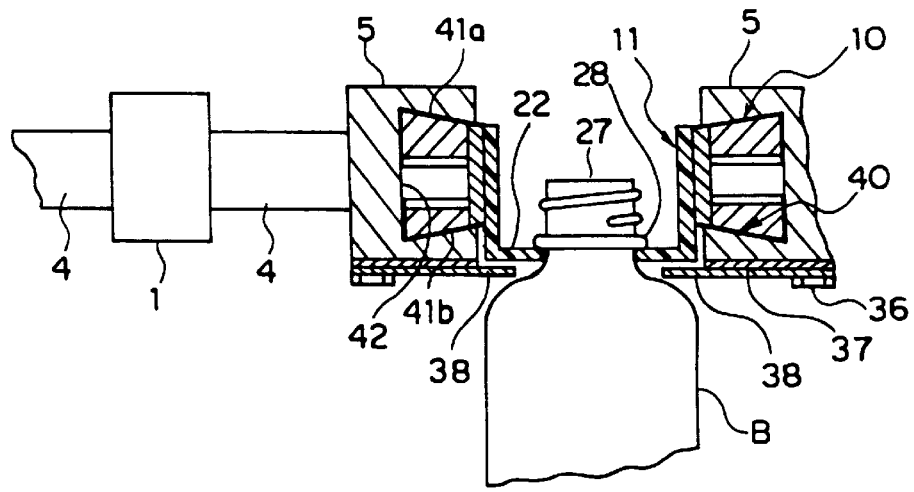
FIG. 8 is a cross-sectional view of the chain guidance member portion of the conveyor chain apparatus of the present invention, taken along the line F—F of FIG. 1.

If necessary, a protective plate 38 could be provided on each of the lower edge surfaces of the chain guidance members 5 and 6 with a liner 27 therebetween, as shown in FIG. 8.

Figure 3A:
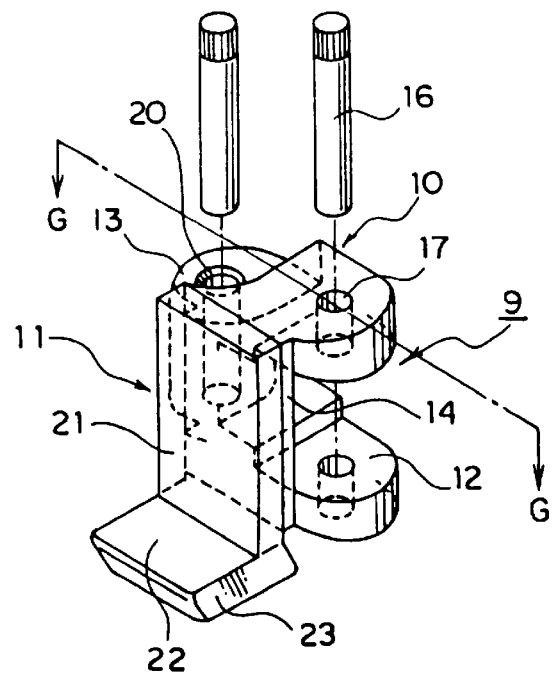
FIG. 3(a) is a perspective view of a chain link used in the first embodiment of the conveyor chain apparatus of the present invention.
Figure 3B:
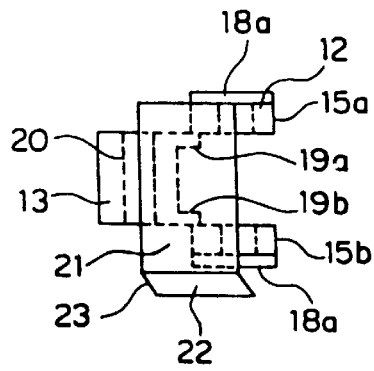
FIG. 3(b) is a side view thereof.
Figure 3C:
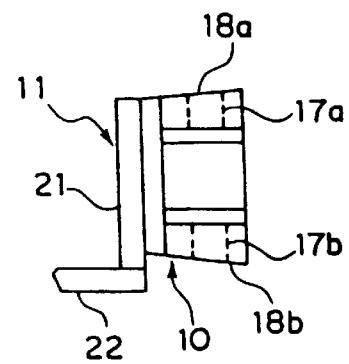
FIG. 3(c) is a front view thereof.
Figure 3D:
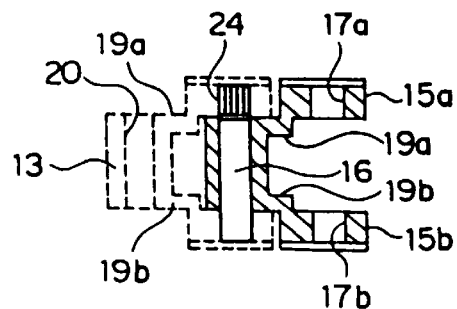
FIG. 3(d) is cross-sectional view of the chain link of FIG. 3(a) taken along the line G—G.

Protruberant ridges 24 are formed at an upper end portion of each connection pin 16 and a connection between links in accordance with the present invention is made by inserting the upper end of that connection pin 16 into the through hole 17a of the link plate 15a and mating the lower end thereof with the through hole 17b, as shown in FIG. 3(d).

Figure 4A:
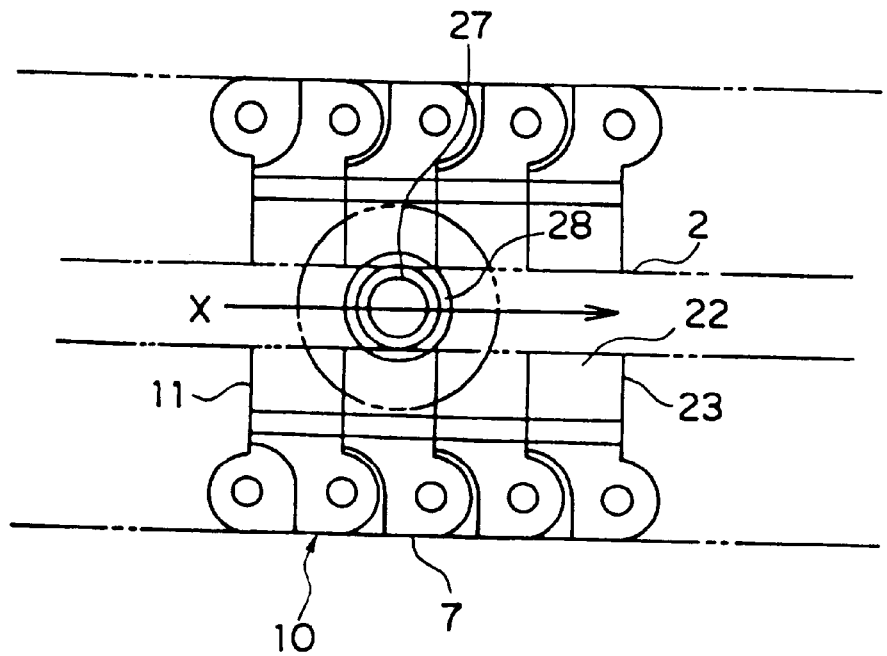
FIG. 4(a) is a plan view illustrating a bottle conveyor portion of the conveyor chain of the present invention and FIG. 4(b) is a side view thereof.
Figure 4B:
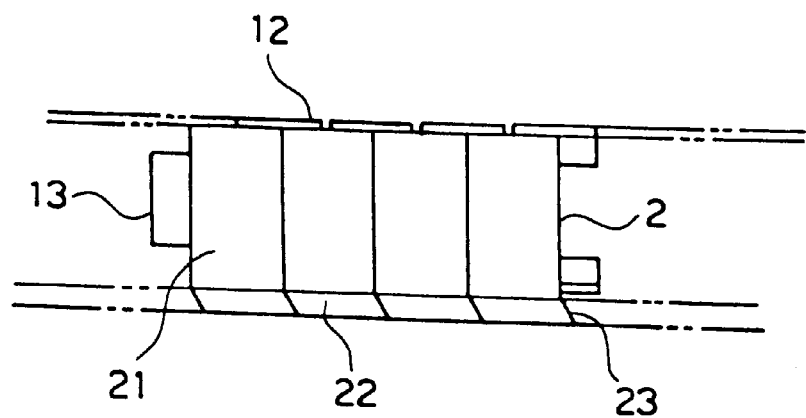

In addition, the bush portion 13 of one main link member 10 fits into the inner sides of the link plates 15a and 15b of the next main link member 10, as shown by broken lines, and the link plates 15a and 15b and the bush portion 13 are connected together by another connection pin 16, to form the conveyor chain 2 as shown in FIGS. 4(a) and 4(b).

The above embodiment was described as having a configuration in which the attachment plate portion 21 of the bottle conveyor member 11 is integral with the attachment portion 14 of the main link member 10, but the conveyor chain apparatus of the present invention is not limited to this configuration, so that the bottle conveyor member 11 and the main link member 10 could equally well be formed as separate bodies using different materials that are fixed together to form a single body by welding or other suitable fixing means.

Figure 5A:
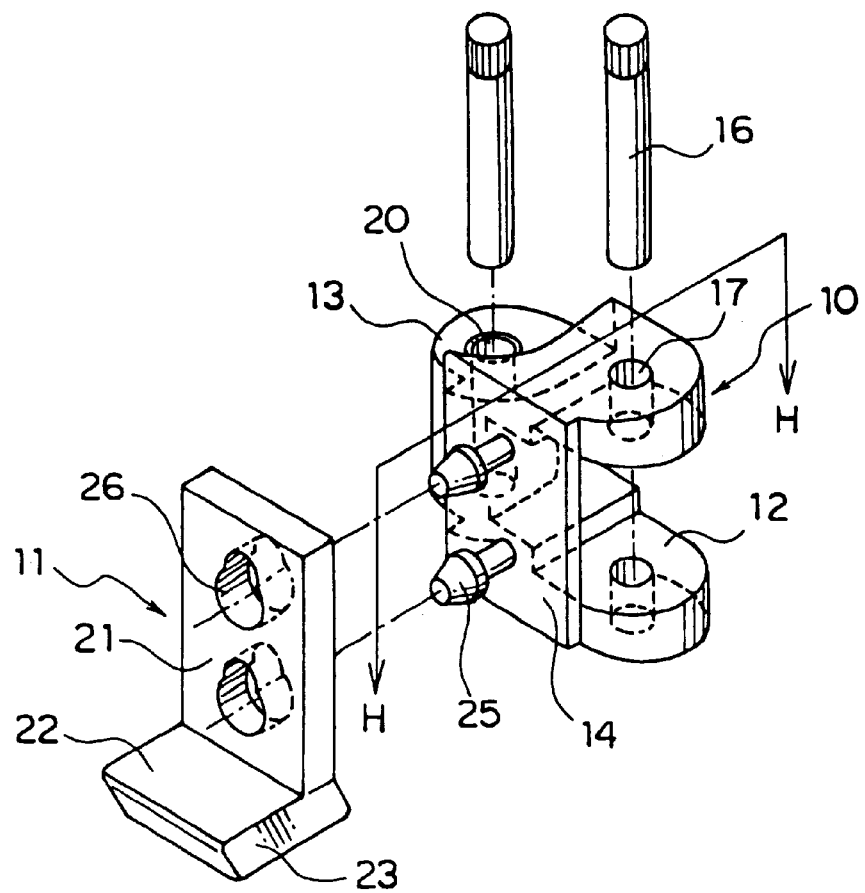
FIG. 5(a) is a perspective view of a chain link used in a second embodiment of the present invention and FIG. 5(b) is a cross-sectional view of the chain link of FIG. 5(a) taken along the line H—H.
Figure 5B:
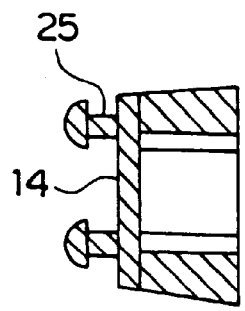
Figures 6A, 6B:
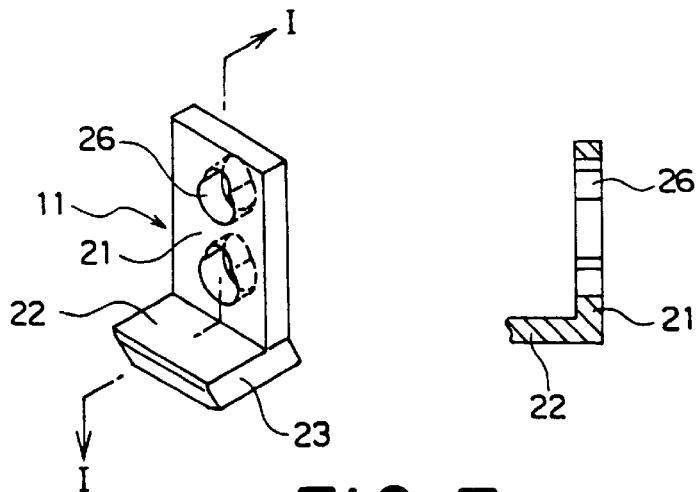
FIG. 6(a) is a perspective view of the bottle conveyor member used in the second embodiment of the present invention and FIG. 6(b) is a cross-sectional view of the bottle conveyor member of FIG. 6(a) taken along the line I—I.

An example of such an embodiment is shown in FIGS. 5 and 6, enabling a configuration wherein a protruding pin 25, to which is attached a head for preventing removal, is provided on the attachment portion 14 of each main link member 10 that forms the conveyor chain, and a slotted hole 26 is provided in the attachment plate portion 21 of another bottle conveyor member 11, whereby the two components are engaged together to form the conveyor chain.

In such a case, the main link member 10 could be formed of a metal or of various other commonly used materials, while the bottle conveyor member 11 alone is formed of a material having abrasion resistance and low friction characteristics.

The various members configuring the conveyor chain apparatus will now be described.

The conveyor chain apparatus of the present invention, which is configured as described above, is arranged in such a manner that the two chain devices A1 and A2 disposed on either side of the bottle conveyer path are capable of pincering and holding the mouth portions of the moving bottles B, as shown schematically in FIG. 1.

A neck portion provided with a holder ring 28 for conveying is formed below the mouth portion 27 of each bottle B, as shown in FIG. 8, and the chain devices A1 and A2 redisposed in such a manner that the bottle neck portions provided with the holder rings 28 are pincered and held from both sides while the holder plates 22 of the bottle conveyor members 11 attached to the conveyor chains 2 disposed on either side of the bottle conveyor path hold the mouth portions of the bottles B, as shown in FIGS. 2 and 4.

Figure 7:
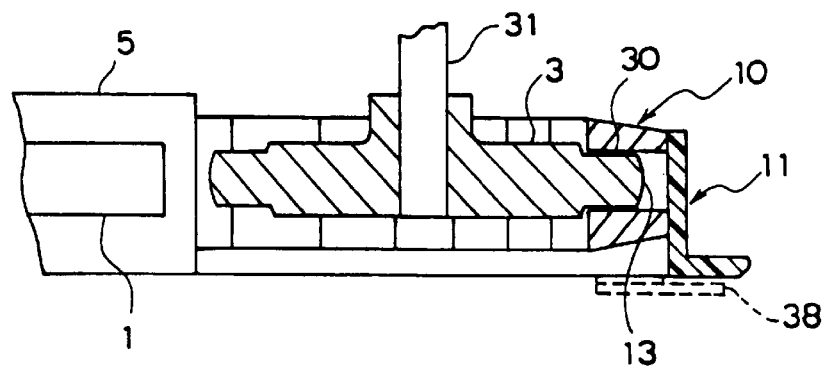
FIG. 7 is a cross-sectional view of the sprocket portion of the conveyor chain apparatus of the present invention, taken along the line E—E of FIG. 1.

The sprocket wheel 3 is provided with sprockets 30 that engage with the bush portion 13 of each chain link 9, as shown in FIG. 7, with the configuration being such that a drive shaft 31 of this sprocket wheel is attached rotatably to a bearing (not shown) provided on the device frame and is rotated by a drive source via a suitable known transmission mechanism.

An attachment plate 33 provided with elongated holes 32 for positional adjustment is attached by screws 34 to each support frame 1 at a rear end of the support frame 1, as shown in FIG. 1, and the idler sprocket wheel 7 is fixed by screws 35 to the attachment plate 33 in an adjustable manner.

Indented guide grooves 40 for guiding the main link members 10 of the conveyor chain 2 are formed in the chain guidance members 5 and 6, as shown in FIG. 8, inner wall surfaces of the guide grooves are formed as gripping surfaces 41a and 41b that are a pair of tapered inclined surfaces matching the upper and lower surfaces 18a and 18b of the link plates 15a and 15b, are the main link members 10 are guided thereby in a state in which they are in contact with base wall surfaces 42 of the guide grooves 40.

If the protective plates 38 are provided on the lower end surfaces of the chain guidance members 5 and 6, they are provided in such a manner as to protrude between the holder plates 22 of the bottle conveyor members 11 and the shoulder portions of the bottles B, and the positions thereof are fixed in an adjustable manner in accordance with the shape and size of the bottles by set screws 36 and screwholes formed as elongated slots, in such a manner that front edge portions of the protective plates 38 do not touch the mouth portions of the bottles.

The above described configuration of the conveyor chain apparatus of the present invention ensures that the conveyor path can be freely rearranged, because the main link members 10 of the conveyor chains 2 do not come out of the guide grooves 40 of the chain guidance members 5 and 6 during the process of conveying the bottles, and the shape of the chain guidance members 5 and 6 disposed on either side can take up various different curves.

The usage of the conveyor chain apparatus will now be described.

When blow molded bottles B that have been removed from the blow-molding apparatus after the blow molding is completed are conveyed by the belt conveyor C1 to the conveyor chain apparatus A of the present invention, as shown in FIG. 2, the neck portions of the finished bottles are pincered and held from both sides by the bottle conveyor members 11 of the conveyor chains 2 of this apparatus, and are conveyed thereby in a suspended state.

During this time, if a bottle on the incoming belt conveyor C1 has fallen over, the fallen bottle will drop from the conveyer without being suspended from the conveyor chains, so that only bottles in a normal state will be conveyed by the conveyor chain apparatus A.

When the correctly suspended bottles B transfer from the conveyor chain apparatus of the present invention onto the belt conveyor C2 for supplying bottles to the next stage, the bottles B are sent on toward the next processing stage in such a manner that they are held at a fixed spacing by the feed screw D.

During this process, the bottles B may be subjected to temporary halts but, since the conveyor members are formed of a material which has low friction characteristics and also the side surfaces of the bottle holder plates are formed in a state in which they are inclined forward in the conveyor direction, the neck portions of the bottles slide smoothly over the holder plates without being caught by the side surfaces of the holder plates, and the bottles are halted stably while being maintained in a suspended state.

In addition, if the protective plates formed of a material with low friction characteristics are provided, and if a halt occurs in the bottles at a position such as at the inlet of the screw and the subsequent bottles become inclined, the striking of the shoulder portions of the bottles against the protective plates 38 ensures that smooth sliding occurs between the holder rings and the holder plates, without the bottle holder plates 22 coming into direct contact with the shoulder portions of the bottles, which ensures that there is no damage to the bottles which would otherwise occur from the strong friction induced by the bottles in an inclined state becoming wedged between the holder plates.

The above embodiments were described as being used for bottles formed by blow-molding, as the objects to be conveyed, but it can easily be comprehended by those skilled in the art that the conveyor apparatus of the present invention can be used for conveying other objects, such as preforms for blow-molding or cups formed to have flanges at upper edges thereof.

INDUSTRIAL APPLICABILITY

The use of the above described configuration of the present invention makes it possible to implement the following effects:

Since the mouth portions of the bottles and pincered and held from both sides by the bottle conveyor members attached to the conveyor chains, so that the bottles are conveyed in a state in which they are suspended by the neck portions thereof, there is no likelihood of the bottles falling down on the conveyor line.

If a toppled bottle should arrive from the previous stage, for example, that bottle will automatically drop from the belt conveyor without becoming suspended by the neck portion thereof, naturally making it possible to prevent the apparatus of the next stage from halting.

In addition, friction between the bottle neck portions and the bottle conveyor members can be reduced as far as possible by forming the bottle conveyor members of the conveyor chains of a low-friction material, so that, since friction does not occur, except at portions such as the feed screw, the occurrence of damage to the bottles due to friction can be suppressed.

The conveyor speed can be controlled in a simple manner by changing the rotational speed of the sprocket wheels and the conveyor speed of the bottles is fixed by the chain pitch, so that there are no collisions between bottles.

While bottles are being sent on to the next stage by the conveyor apparatus of this invention, a feed screw at the inlet of the next stage ensures that the bottles slide smoothly over the holder plates without being caught by the side surfaces of the holder plates, even if they are temporarily delayed, so that the bottles are halted stably while being maintained in a suspended state.

If a halt occurs in the bottles at a position such as at the inlet of the feed screw and the subsequent bottles become inclined. The provision of the protective plates below the bottle holder plates ensures smooth sliding between the holder rings of the bottles and the holder plates, without the bottle shoulder portions coming into direct contact with the bottle holder plates, so that no damage occurs.

What is claimed is:

1. A conveyor chain apparatus for conveying a bottle along a conveyor path by a holder ring in the neck of the bottle, comprising:

a conveyor chain formed of chain links connected by connecting pins, each of said chain links comprising:

a main link portion with a projecting end and a receiving end, each end having one or more holes so that the projecting end of one link fits into the receiving end of another link and the connecting pins form the chain links into the conveyor chain; and a bottle conveyor portion, wherein said conveyor chain apparatus is disposed on both sides of the conveyor path.

2. The conveyor chain apparatus according to claim 1, wherein a main link member and the bottle conveyor member of said chain link are formed integrally by injection-molding a composite resin.

3. The conveyor chain apparatus according to claim 1, wherein the bottle conveyor portion comprises a substantially L-shape member having side surfaces inclined forward in a conveyor direction.

4. The conveyor chain apparatus according to claim 1, wherein the bottle conveyor portion is formed of a low-friction material in such a manner that, when bottles are delayed, the bottles are maintained in a suspended state and slide over a plurality of bottle conveyor portions.

5. The apparatus of claim 1, further comprising sprocket wheels and chain guidance members.

6. The apparatus of claim 5 wherein said chain guidance members are provided with guide grooves for guiding the chain links.

7. The conveyor chain apparatus according to claim 5, wherein a protective plate is provided protruding from said chain guidance members underneath the bottle conveyor portion.

8. The apparatus of claim 5, further comprising upper and lower surfaces of the bottle conveyor portion that are formed as surfaces inclined towards the main link portion.

9. The apparatus of claim 1, further comprising a main offset link portion of the main link portion comprising a pin link, a bushing, and a conveyor member attachment plate, that detachably attaches the bottle conveyor portion.

10. The conveyor chain apparatus according to claim 9, wherein a main offset link member of said chain link, comprising a pin link, a bushing, and a conveyor member attachment plate, is formed integrally by injection-molding a composite resin and also a protuberant pin to which is attached a removal-preventing head is formed in said conveyor member attachment plate, such that said bottle conveyor member engages in a freely detachable manner to said protuberant pin.

11. The conveyor chain apparatus according to claim 9, wherein said bottle conveyor portion comprises a substantially L-shape member having side surfaces inclined forward in a conveyor direction.

12. The conveyor chain apparatus according to claim 9, wherein said bottle conveyor portion is formed of a low-friction material in such a manner that, when bottles are delayed, the bottles are maintained in a suspended state and slide over a plurality of L-shaped bottle conveyor portions.

13. The apparatus of claim 9, further comprising sprocket wheels and chain guidance members.

14. The conveyor chain apparatus according to claim 13, wherein upper and lower surfaces of a link plate of the chain links are formed as surfaces inclined towards the main link portion.

15. The conveyor chain apparatus according to claim 13, wherein said chain guidance members are provided with guide grooves for guiding the chain links.

16. The conveyor chain apparatus according to claim 13, wherein a protective plate is provided protruding from said chain guidance members underneath the bottle conveyor portion.

* * * * *